E. EK.
REGISTER FOR LINEAL MEASURING.
APPLICATION FILED MAR. 2, 1920.
1,392,573.
Patented Oct. 4, 1921.
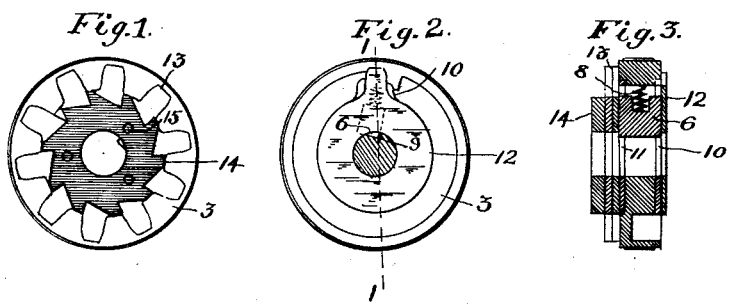
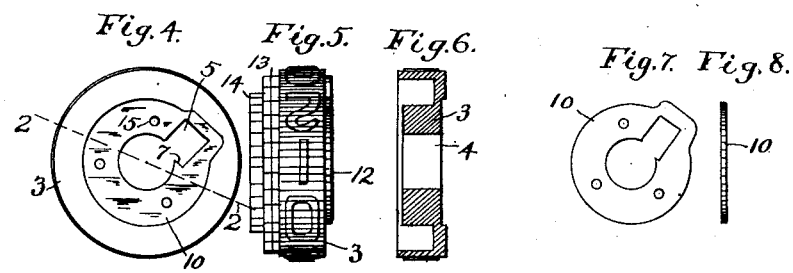
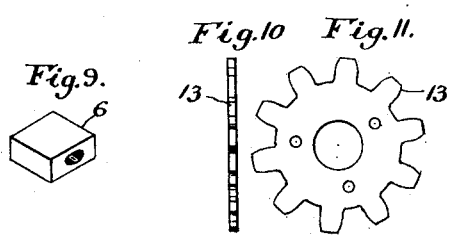
Inventor:
Emil Ek
by S. W. Bates
Atty.

UNITED STATES PATENT OFFICE.

EMIL EK, OF PORTLAND, MAINE, ASSIGNOR TO ADDE & COMPANY, A CORPORATION OF MAINE.

REGISTER FOR LINEAL MEASURING.

1,392,573.  Specification of Letters Patent.  Patented Oct. 4, 1921.

Application filed March 2, 1920. Serial No. 362,725.

*To all whom it may concern:*

Be it known that I, EMIL EK, a citizen of the United States, residing at Portland, in the county of Cumberland and State of Maine, have invented certain new and useful Improvements in Registers for Lineal Measuring, of which the following is a specification.

My invention relates to various features of improved construction of the meter shown in my Patent No. 888,599, dated May 26, 1908.

According to my said Letters Patent the number wheel was formed of a solid wheel body with a central shaft opening and a recess formed in one face of the wheel outside of the shaft in which recess was pivoted a spring pawl of ordinary construction.

This pawl was made of a comparatively thin piece of metal pivoted to the wheel and the wear on the point of the pawl and on the pivot in the long continued use of the device was very considerable.

After the point of the pawl and the ratchet tooth or groove in the shaft reached a certain amount of wear the efficiency and certainty of operation of the machine was impaired.

The object of this feature of my present invention is to construct a number wheel for my machine which will have a pawl of great wearing capacity and which may be quickly and easily assembled.

According to my invention, I construct my number wheel with a shaft opening and an offset opening connecting laterally with said shaft opening and a block pawl in said offset opening and having a motion to and from said shaft and a spring for forcing said block pawl into engagement with the shaft.

As I prefer to construct the wheel, the wheel body is made of a soft metal casting with a hard metal washer riveted at each side and having shaft openings and offset openings registering with the corresponding openings in the wheel body so that the wear of the shaft and of the ends of the block pawl as it slides in and out will be taken by the hard metal washers and not by the softer metal of the body.

I have illustrated the preferred form of the several features of my invention in the accompanying drawing in which, Figure 1 is a face view of my unit number wheel, Fig. 2 is a face view on the opposite side, Fig. 3 is a section taken on the lines 1—1 of Fig. 2, Fig. 4 is a face view on one side with the pawl guiding and reinforcing washer exposed, Fig. 5 is an edge elevation, Fig. 6 is a section of wheel body taken on the line 2—2 of Fig. 4, Fig. 7 is a face view of the pawl-guiding and reinforcing washer, Fig. 8 is an edge elevation of the same, Fig. 9 is a perspective view of the pawl, Fig. 10 is an edge elevation of one of the gear sections, and Fig. 11 is a face view of the same.

Referring to the drawing, the figure wheel is made up of a wheel body 3 which is as I now make it, cast from type metal with numbers in low relief on the periphery of the wheel and with a deep rectangular channel extending in between the hub and the rim or wheel.

In the center of the wheel body is a shaft opening through which the grooved shaft passes and connecting with the shaft opening at one side is an offset opening 5 preferably rectangular in form.

Within this offset opening a block pawl is adapted to fit and to slide toward and from the center. The rectangular offset opening is so formed that one of its sides is in line with the center and when the pawl is in its inner position one of its corners projects slightly into the shaft opening, a shoulder 7 being formed at the inner end of the offset opening to limit the inward motion of the pawl (see Fig. 4). The operative edge of the pawl engages the angular groove 9 formed in the shaft. The pawl is forced toward the center by a spiral spring which bears against the outer end of the offset opening 5.

The block-pawl is somewhat longer in a direction parallel with the shaft than the soft metal wheel body and for the purpose of taking the bulk of the wear off the wheel 3 I make use of a pair of hard metal reinforcing washers 10 and 11, one on each face of the wheel. Each of these washers has formed an opening registering with the shaft opening and the offset opening in the wheel body to guide and hold the pawl in position so that said pawl will not come in contact with the soft metal body. The two sides of the wheel are provided with suitable gears according to the work to be done. As here shown, the wheel has on one side a gear 12 with a single tooth and on the opposite side a gear 13 is formed with 10 teeth. This latter gear is made up of two thicknesses of metal stampings placed face to face so that the teeth register exactly and the two parts constitute a single gear. This makes up the unit gear of the patent. The gears on the other number wheels have but a single thickness. Outside of the gear 13 is a ratchet wheel 14, also formed with a shaft opening. All these parts, namely, the gear 12, reinforcing and guiding washers 10 and 11, wheel body 3, gear 13 and ratchet wheel 14 are securely fastened together by rivets 15 which extend through from the face of the ratchet wheel 14 to the face of the gear 12 so that the wheel is all one solid structure. It will be seen that the operative edge of the pawl extends along in the shaft groove from face to face of the wheel, the two ends of the pawl traveling in the reinforcing guide washers which take the wear.

The pawl has no pivotal motion, does not require lubrication, it has a broad operating point or edge, it may be easily assembled and adds greatly to the efficiency of my meter for measuring the lineal feet of boards and for other like purposes.

I claim:

In a register for lineal measuring, the combination with a grooved shaft of a number wheel composed of a soft metal wheel body having a shaft opening and an offset opening communicating laterally with said shaft opening, a hard metal washer at each end of said wheel body having a shaft opening and an offset opening, a pawl block extending through said offset opening and havings its ends seated and guided within the openings in said washers, said pawl block being adapted to engage the shaft groove and means for uniting said washers in said wheel body.

In testimony whereof I have affixed my signature.

EMIL EK.